Aug. 11, 1959    W. A. STEINBERG    2,899,627
RECTIFYING APPARATUS AND METHOD
Filed Dec. 11, 1953    3 Sheets-Sheet 1

INVENTOR
Walter A. Steinberg
BY
Burgess, Ryan & Hicks
ATTORNEYS

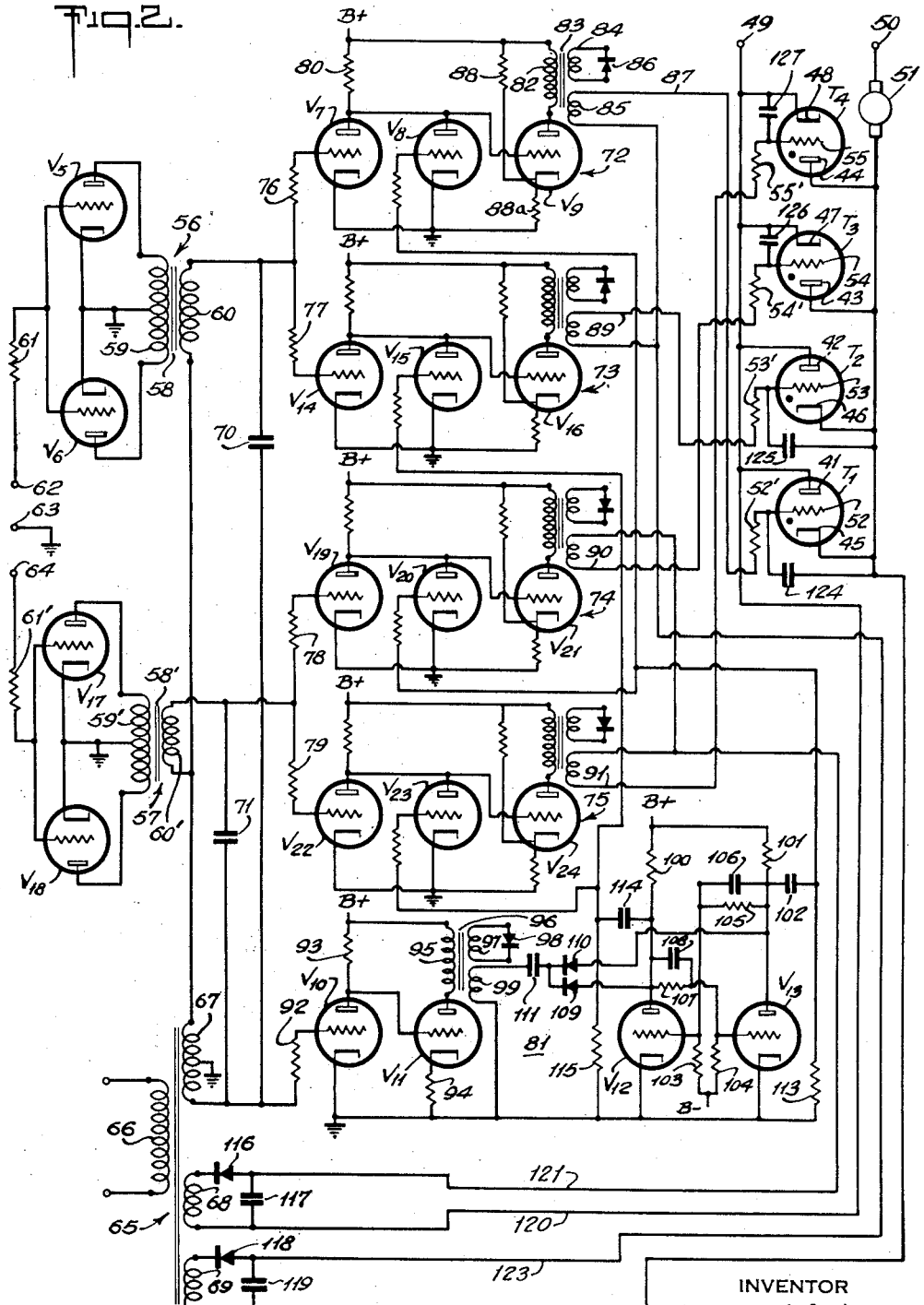

Aug. 11, 1959 W. A. STEINBERG 2,899,627
RECTIFYING APPARATUS AND METHOD
Filed Dec. 11, 1953 3 Sheets-Sheet 3
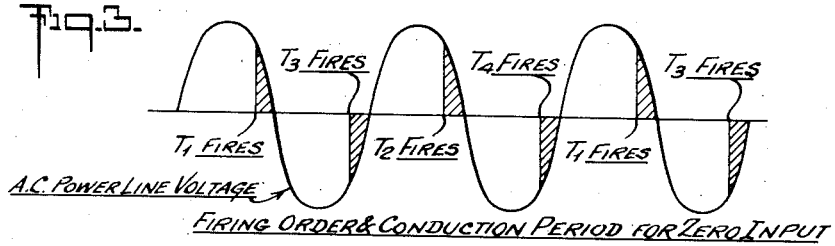
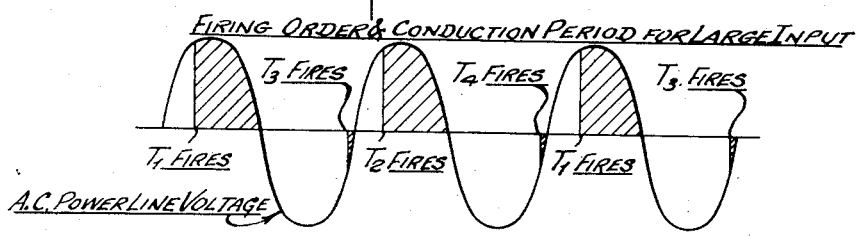
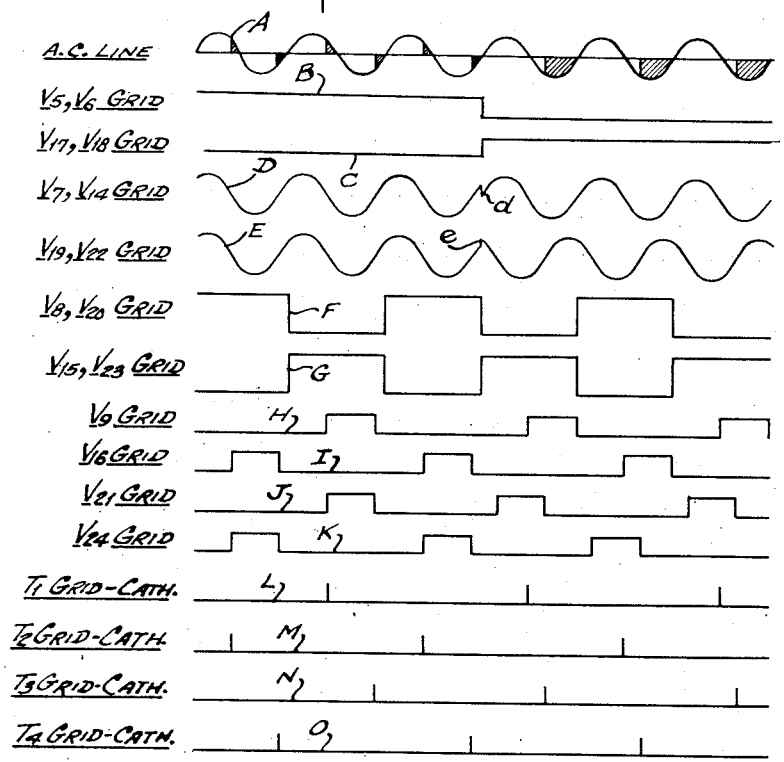
INVENTOR
Walter A. Steinberg
BY
Burgess, Ryan & Hicks
ATTORNEYS

United States Patent Office 2,899,627
Patented Aug. 11, 1959

2,899,627

RECTIFYING APPARATUS AND METHOD

Walter A. Steinberg, Brooklyn, N.Y., assignor to Reeves Instrument Corporation, New York, N.Y., a corporation of New York Application December 11, 1953, Serial No. 397,697

12 Claims. (Cl. 321—27)

This invention relates to electronic rectifying systems and more specifically to an improved circuit and method for operating a number of rectifiers in parallel to supply current demands that may exceed the maximum average rating of a single rectifier.

In many applications requiring the generation of a direct current, the current requirements are of such a nature that it is neither economical nor desirable to employ a single rectifier having a sufficiently high maximum average current rating to enable it to handle the entire load. In these cases two or more rectifiers are generally employed in parallel and in either half or full wave circuits so that their combined output will satisfy the load requirements.

The connection of rectifiers in parallel involves the use of suitable current limiting means for each rectifier to insure a substantially uniform distribution of load between them. In the case of thyratron and other grid controlled rectifiers for providing a variable D.C. output, present systems for connecting them in parallel result in maximum loads that are usually much less than the tube ratings. In full wave or polyphase operation of thyratrons, complicated interlocking controls are necessary to prevent short circuit currents from flowing when two tubes are simultaneously actuated to conduct an electric current. Furthermore direct parallel operation of thyratrons is unreliable since the firing of one tube will reduce the voltage across the others and prevent the others from firing. While the thyratrons when simultaneously actuated will theoretically fire at one time, actual practice has indicated that such response can not be assured.

The invention therefore provides an improved circuit for multiple operation of grid controlled rectifier tubes that overcomes the aforementioned difficulties and takes advantage of the peak current rating of the tubes but does not exceed the average current rating thereof. This is attained through an improved circuit for controlling the duty cycle of each of the tubes wherein only one tube is permitted to fire at a time and the number of tubes employed is a function of the ratio of the peak current rating to the average current rating.

Another object of the invention is an improved circuit for operating rectifiers in parallel wherein short circuit currents are completely eliminated. The failure of one rectifier to fire or start to conduct upon receipt of a given impulse will not cause the entire system to fail. While in certain cases where the system is operating at full load conditions, some overloading will occur, the system will nevertheless continue to function. On the other hand power supplies rarely operate at full load conditions so that a rectifier circuit according to the invention would continue to operate effectively until such time as the inoperable rectifier can be replaced.

The above and other objects and advantages will become more apparent from the following description and accompanying drawings forming part of this application.

In the drawings:

Fig. 2 is a circuit diagram of another embodiment of the invention for controlling the operation of a direct current motor.

Figs. 3 and 4 are wave forms illustrating certain aspects of the operation of the circuit of Fig. 2; and Fig. 5 depicts detailed wave forms showing the voltages at various points in the circuit of Fig. 2 and their relationship one to the others.

Figure 1:
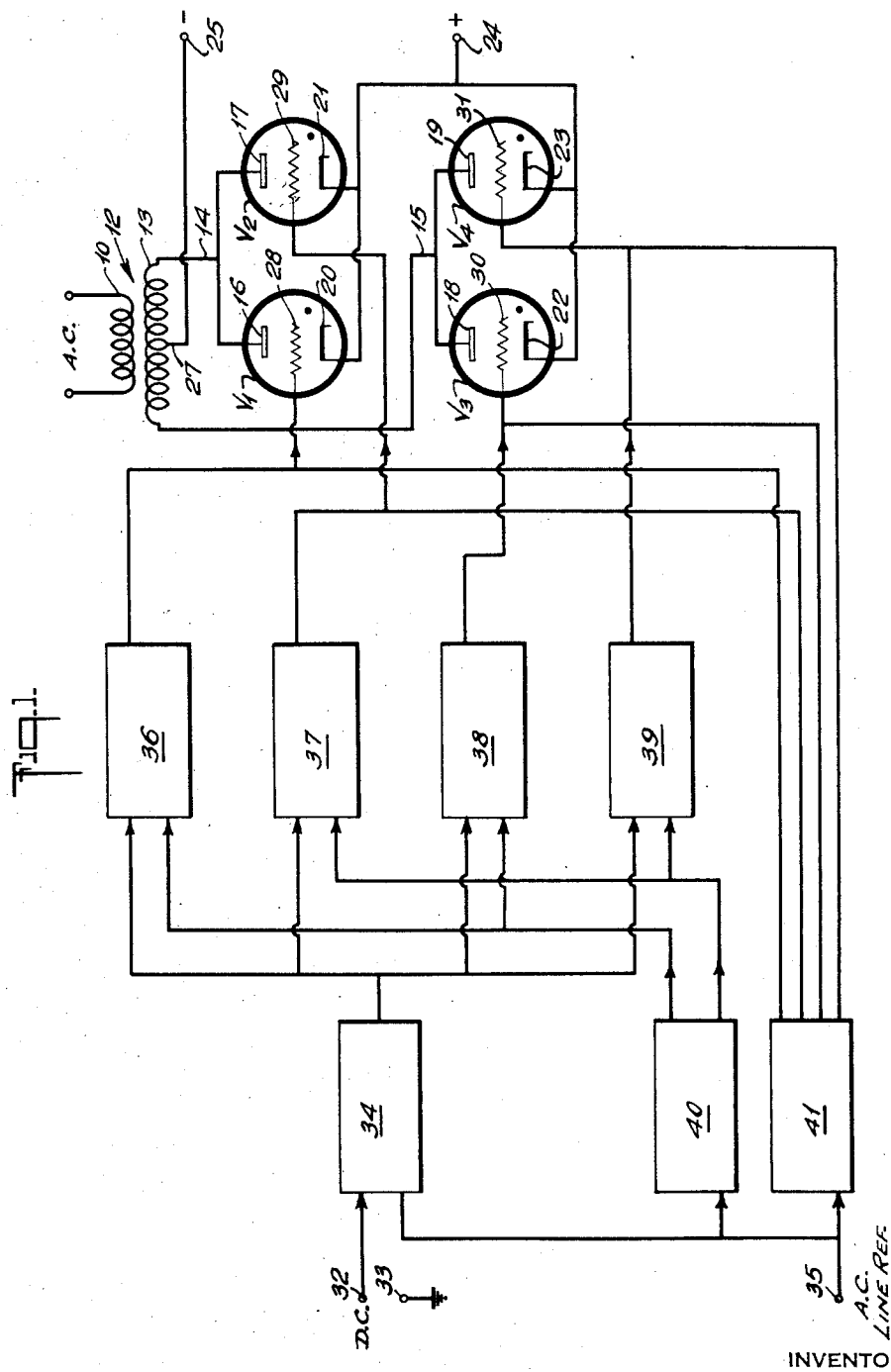
Fig. 1 is a block diagram of one embodiment of the invention wherein a plurality of grid controlled rectifiers are used to provide controlled full wave rectification of an alternating current.

The block diagram of Fig. 1 illustrates the application of the invention to a full wave rectifier utilizing four thyratrons for providing a variable D.C. output voltage. In this figure the thyratrons are denoted by V1, V2, V3 and V4. The alternating current source to be rectified is connected to the primary winding 10 of the transformer 12. The center-tapped secondary winding 13 has one end terminal 14 connected to the plates 16 and 17 of tubes V1 and V2 while its other end terminal 15 is connected to the plates 18 and 19 of tubes V3 and V4. The cathodes 20 to 23 inclusive of the several tubes are connected in parallel and to the positive terminal 24 for connection of the D.C. load. The negative output terminal 25 is connected to the centertap 27 of the winding 13.

The operation of each of the thyratron tubes is initiated by the application of a control signal to their respective grids 28 through 31 and the length of the duty cycle is determined by the time during which the plate of the tube is positive relative to its cathode after the control signal has been applied to cause the tube to conduct. The generation of the control signals for each tube must therefore be accomplished in a manner that enables the several tubes to operate individually and for that part of its duty cycle that will provide the desired output current. For present purposes let it be assumed that the basic control voltage is a source of variable direct current applied between the input terminals 32 and 33. It is quite apparent however that an alternating current signal would function equally well by the insertion of suitable rectifying means well known in the art.

This D.C. control voltage is applied to the input of a phase shifter 34 along with an alternating current reference signal applied to the input terminal 35. This reference signal must either be in phase with the alternating current applied to winding 10 of transformer 12, or their relative phases must be known. The output of the phase shifter 34 is fed to each of the pulse generators 36 through 39 which in turn determine the firing order of the thyratrons. In the present embodiment of the invention, one thyratron is fired on each half cycle with a firing order V1—V3—V2—V4. Thus on the positive half cycles V1 and V2 would be alternately fired while on the negative half cycles V3 and V4 would be alternately fired.

The firing order of the thyratrons is controlled by a half frequency gate 40 having one output applied to pulse generators 36 and 38 and another output applied to pulse generators 37 and 39. The phase of this half frequency gate is controlled by the A.C. reference signal applied to terminal 35 and activates the generators 36 and 38 during one cycle of the current in winding 13 and then activates generators 37 and 39 during the next cycle and so on. The firing order of the pairs of generators 36, 38 and 37, 39 is of course determined by the reference signal applied to the phase shifter 34 and to the half frequency gate 40.

In order to insure that each tube V1 to V4 is completely cut off in the absence of a firing signal, a bias generator 41, powered by the reference signal applied to terminal 35, is connected to the grids 28 to 31 of the four thyratrons. It functions to bias each tube and inactivate it during the half cycles other than the firing half cycle and thus insures the firing of but one tube at a time.

The magnitude of the output voltage is of course a function of the point in each half cycle that the tubes are fired. If the firing is near the end of the half cycles substantially zero output will be obtained while advancement of the firing to a point near the beginning of each half cycle will produce substantially maximum voltage. The phase shift of the firing signals is produced by the phase shifter 34 in response to changes in the magnitude of the D.C. control potential applied to terminal 32. Since the firing signals of all generators 36 to 39 are used to control a full wave rectifier, only one phase shifter 34 is needed. In other applications such as that in the embodiment of Fig. 2 additional phase shifters are required in order to advance and retard the firing points in the manner required.

With the system described above, only one thyratron fires at a given time which prevents the generation of short circuit currents and eliminates the problems of firing two or more tubes simultaneously. In addition each tube functions for only a portion of a half cycle and since the maximum load that a given tube can handle is a function of time, substantially peak currents can be drawn through each tube while observing the maximum average current rating. This results in the realization of a total available rectified current substantially equal to the sum of the average current ratings of each of the tubes employed.

Referring now to the embodiment in Fig. 2, showing in detail a circuit for controlling a D.C. motor, it will be observed that the principles discussed in connection with Fig. 1 apply and that in general the basic circuit elements of Fig. 2 are the same as the circuit elements of Fig. 1.

The thyratron rectifier tubes in this figure are denoted by T1, T2, T3 and T4 and are connected to provide a D.C. potential variable in both polarity and magnitude. More specifically the plates 41 and 42 of tubes T1 and T2 and the cathodes 47 and 48 of tubes T3 and T4 are connected together and to the A.C. supply terminal 49. Similarly the cathodes 45 and 46 of tubes T1 and T2 and the plates 43 and 44 of tubes T3 and T4 are connected together and to the A.C. terminal 50 through a D.C. motor 51 to be controlled. With this arrangement the D.C. potential developed across the motor 51 will be a function of the points in their respective half cycles at which the tubes are fired. By properly controlling the firing sequence and phase of the firing pulses relative to the A.C. supply, the D.C. current through the motor can be varied from a maximum value in one direction, through zero to a maximum in the other direction. The circuit for applying these firing pulses to the grids 52 to 55 of tubes T1 to T4 will now be discussed.

Since it is necessary to vary the phase of the firing pulses of T1 and T2 in a direction opposite to those of T3 and T4 it is necessary to employ two phase shifters 56 and 57 of the type discussed in connection with Fig. 1 and denoted therein by the numeral 34. Phase shifter 56 includes a transformer 58 having a center tapped primary 59 and a secondary 60. A pair of electron tubes V5 and V6 are connected back to back across the primary 59 with the cathodes being returned to the centertap. The grids are coupled together and connected through a resistor 61 to terminal 62 of a balanced D.C. control signal source. The center tap of this control signal source is connected through terminal 63 to ground while the other side is connected to terminal 64 and through a series resistor 61' to the grids of tubes V17 and V18 of phase shifter 57. This phase shifter is connected in the same manner as the phase shifter 56 with the tubes V17 and V18 being connected back to back across the primary 59' of the transformer 58'. With this arrangement the resistance seen across the secondaries 60 and 60' with an alternating current applied thereto is a function of the D.C. potential applied to the grids of the tubes associated therewith, the tubes V5—V6 and V17—V18 drawing current on alternate half cycles. If the control voltage applied to the grids of the tubes comprising one of the phase shifters 56 or 57 is sufficiently negative to cut off the tubes, the output impedance of the associated transformer secondary winding will be relatively high. As the control voltage is made more positive, current will flow in the tubes and the impedance presented by the transformer secondary which is predominantly resistive, will decrease due to the decreased plate resistance of the tubes. Resistors 61 and 61' serve to limit the flow of grid current on large positive input signals.

The alternating current supply for the windings is obtained from a power transformer 65 having a primary 66 connected to an A.C. source and three secondaries 67, 68 and 69. This A.C. source is preferably the same source connected with terminals 49 and 50 or it should be in phase therewith. The winding 60 of transformer 58 is connected in series with a condenser 70 and winding 67, the latter having its centertap connected to ground. The winding 60' is similarly connected with a condenser 71. With a balanced D.C. control signal applied to terminals 62, 63 and 64, the resistances presented by windings 60 and 60' will vary and consequently vary the phase of the A.C. voltage appearing at the junctures of winding 60 and condenser 70 and winding 60' and condenser 71. A phase shift of slightly less than 180° can be attained as indicated by experiment.

The phase shifters 56 and 57 control the operation of the pulse generators denoted generally by the numerals 72 to 75. All of the generators are identical in structure and therefore the circuit and operation of only one will be described in detail. In this embodiment, the phase shifter 56 controls the generators 72 and 73 by a connection between the juncture of winding 60 and condenser 70 to the tubes V7 and V14 of the generators 72 and 73. Phase shifter 57 likewise has a connection between the juncture of winding 60' and condenser 71 and the grids of tubes V19 and V22. In addition the grids of tubes V7, V14, V19 and V22 each include a current limiting resistor 76 to 79 inclusive.

To clarify the operation of the circuits thus far described reference is made to the curves A through O of Fig. 5. In this figure the curve A represents the A.C. voltage applied to the terminals 49 and 50. Curves B and C show the control voltage applied to terminals 62 to 64 with a change about midway to show the application of a negative voltage to the grids of V5 and V6 and a positive voltage to the grids of V17 and V18. Curves D and E show the phases of the voltages applied to the input of the pulse generators 72, 73 and 74, 75 respectively and the phase shift produced by the change in control voltage. It will be observed that at point d on curve D the phase has been retarded while at point e on curve E the phase has been advanced.

Referring now to the pulse generator 72, the tube V7 has its plate and cathode connected in parallel with a similar tube V8. The cathodes are connected to ground while the plates are connected through a common resistor 80 to the positive side B+ of a source of direct current. The grid of tube V8 is fed by a signal from the half frequency gate generator generally denoted by the numeral 81 and functions to control the transmission of a signal from the plate of V7 to the grid of tube V9. The signal applied to the grid of tube V8 is a square wave and is represented by curve F of Fig. 5 and is synchronous and in phase with the A.C. voltage of curve A. The tube V7 is either strongly conducting or close to cut off at the start of each half cycle and consequently the voltage at its plate is a square wave in phase with the signal applied to the grid. The tube V8 is also either strongly conducting or near cut off but operates at half the frequency of the tube V7. Thus when the tube V8 is at cut off (a negative potential being applied to its grid), it does not interfere with the operation of the tube V7 and a signal can be transmitted to the grid of the tube V9. When the tube V8 is conducting it draws current through resistor 80 of such a magnitude that no signal can pass to the tube V9. The result is that the signal on the grid of the tube V9 is a positive rectangular pulse for one half cycle and a negative pulse for three halves of a cycle. This is shown in curve H. The voltages at the grids of tubes V16, V21 and V24 of generators 73 to 75 which correspond to tube V9 of generator 72 are shown in curves I, J and K respectively of Fig. 5. Because the gate 81 produces two signals 180° apart with one signal being applied to generators 72 and 74 and the other to generators 73 and 75, these two sets of generators with zero D.C. control voltage produce signals on the grids of tubes V9, V21 and V16, V24 approximately 180° apart.

Now the plate of tube V9 is connected in series with the primary 82 of the pulse transformer 83 to B+. The secondary 84 of transformer 82 is shunted by a crystal diode 86 so that only a pulse in one direction will be generated in winding 85 which has one side connected by means of wire 87 to thyratron T1. The cathode of the tube V9 is connected to the junction of resistors 88 and 88a which are in turn connected between B+ and ground. The bottom side of the winding 85 is returned to the cathode of its associated thyratron through the bias generator which includes windings 68 and 69 of transformer 65.

The circuit and operation of the pulse generators 73 to 75 are identical to generator 72 with the exception of phasing which will be described in detail. The generators 73 to 75 are connected to the grids 53 to 55 of thyratron tubes T2 to T4 by the leads 89 to 91 respectively.

Considering now the half frequency gate generator 81 which includes tubes V10, V11, V12 and V13, the tube V10 has its grid fed by one half of the secondary winding 67 of transformer 65 through a series resistor 92. The cathode is tied to ground and the plate is connected to the grid of tube V11 and to B+ through a load resistor 93. This tube is therefore either strongly conducting or at cut off and thus produces a square wave at its plate in phase with the A.C. line. The tube V11 has its cathode biased by a resistor 94 connected between it and ground, while the plate is connected through the primary 95 of a pulse transformer 96 to B+. One secondary winding 97 is shorted by a diode rectifier so that only negative pulses will appear on the secondary winding 99 of transformer 96. Tubes V12 and V13 are connected as a bistable multivibrator to produce two half frequency pulses of opposite phase for actuation of the tubes V8, V15, V20 and V23 of the generators 72 to 75. In this multivibrator, the cathodes of tubes V12 and V13 are connected to ground, while the plates are connected to B+ through resistors 100 and 101 respectively. The grids are tied to B— through resistors 103 and 104 and control signals are applied from the plates of the opposite tubes. Specifically the grid of tube V12 is tied to the plate of tube V13 through resistor 105 and parallel condenser 106 and the grid of tube V13 is connected to the plate of tube V12 by resistor 107 and parallel condenser 108. The multivibrator is energized by connection of the plates of the tubes through individual rectifiers 109 and 110 and condenser 111 to the winding 99 of transformer 96. One output is obtained at the junction of condenser 102 and resistor 113 which are connected between the plate of tube V13 and ground. This output feeds the grids of tubes V8 and V20 through appropriate series resistors. The other output is obtained from the junction of condenser 114 and resistor 115 connected between the plate of tube V12 and ground and is fed to the grids of tubes V15 and V23. Since these two outputs are 180° out of phase, the pulse generators 72, 74 and 73, 75 will be phased accordingly.

It will be observed that the diode rectifiers on the pulse transformers of the generators 72 to 75 are arranged so that the generators 72 and 73 produce pulses in one direction while generators 74 and 75 produce pulses in the other direction. In the case of generators 74 and 75, however, the windings are connected reversely to those of generators 72 and 73 so that all the pulses are positive relative to ground, and, with a zero control signal at terminals 62—64, approximately 180° apart. By reason of the phasing of these pulses (see curves L to O of Fig. 5), the pulses in terms of time fire the thyratrons in the order T1, T3, T2, T4.

In order to assure that the thyratrons do not fire in the absence of a pulse the grids of the tubes T1 to T4 are negatively biased. This is attained by the windings 68 and 69 on the transformer 65. The winding 68 includes a series connected rectifier 116 and a condenser 117 between the output of the rectifier and the other side of the winding. This produces a D.C. voltage across the condenser 117 and the positive side is connected through the lead 120 to the plates 41 and 42 and cathodes 47 and 48 of tubes T1 to T4. The negative side of condenser 117 is connected through the lead 121 to the output windings of the pulse transformers of generators 74 and 75. The second bias supply is obtained from winding 69, rectifier 118 and condenser 119. In this case the positive side of condenser 119 is connected through lead 122 to the cathodes 45 and 46 and plates 43 and 44 of tubes T1 to T4, while the other side is connected by lead 123 to the output winding of the pulse transformers of generators 72 and 73. The grids 52 to 55 of tubes T1 to T4 are fed through series resistors 52′ to 55′ and each grid is by-passed to cathode by condensers 124 to 127 in order to prevent firing of the tubes by undesired signals such as radio frequency disturbances and the like.

Referring again to the curves of Fig. 5, the change in the D.C. control voltage as indicated by curves B and C and reflected in phase shifts in curves D and E influences the phase of the square wave signals applied to the grid of tubes V9, V16, V21 and V24 as shown in curves H, I, J and K. The application of a negative voltage to terminal 62 has retarded the phase of the signals in curves H and I while a positive signal at terminal 64 has advanced the square waves of curves J and K. These phase shifts of course affect the phase of the firing signals of curves L to O accordingly.

Figs. 3 and 4 of the drawings show the final result attained by the circuit of Fig. 2. In the curve of Fig. 3, the condition of zero input is illustrated. All tubes T1 to T4 fire near the end of their respective cycles and thus produce zero output voltage. If the D.C. control terminal 62 is made positive and terminal 64 negative, the firing pulses of T1 and T2 will be advanced as shown in Fig. 4 by the shaded areas while the pulses for T3 and T4 will be retarded. The result is a D.C. current of one polarity. Now if the D.C. control voltage is reversed relative to terminals 62 and 64 a D.C. current of reversed polarity will result. It is quite obvious from this that the D.C. current through the motor 51 can be uniformly varied throughout its entire range. Moreover maximum output is realized from the tubes T1 to T4 and under conditions where the unit is operating at something less than full load, failure of one tube will not interrupt operation. Thus the same advantages are gained here as in the case of the embodiment of Fig. 1.

While both of the embodiments of Fig. 1 and Fig. 2 pertain to the rectification of single phase A.C. and provide a variable direct current, the principles are equally applicable to polyphase systems. Moreover, circuit and other modifications, changes and alterations may be made without departing from the basic principles, scope and spirit of the invention as set forth and described.

I claim:

1. Rectifying apparatus for alternating current comprising a plurality of grid controlled rectifiers connected to produce a source of direct current for energizing a load, signal producing means individual to each rectifier for initiating the operation thereof and gate generating means coupled to said signal producing means, said gate generating means being adapted to cause said signal producing means to activate said rectifiers in a predetermined sequence and at a frequency less than that of said alternating current with each rectifier functioning to carry substantially the entire load for a period of time not greater than one quarter of the time of said sequence.

2. In rectifying apparatus for producing a direct current from a source of alternating current, the combination of at least two grid controlled rectifier tubes connected in parallel, square wave firing pulse generating means individual to and coupled with the grid of each tube for periodically firing said tube and causing it to conduct, means for controlling the pulse rate of said generators whereby successive pulses of each generator are produced at a frequency not greater than one half the frequency of said alternating current with the pulses of the pulse generators being phase displaced relative to each other, and means for preventing the firing of said tubes during the absence of a firing pulse.

3. In rectifying apparatus according to claim 2 wherein said combination includes phase shifting means for changing the phase of said firing pulses relative to said alternating current.

4. In apparatus for producing a direct current variable in polarity and magnitude from a source of alternating current, at least four grid controlled rectifier tubes each having a plate, grid and cathode, connections between the plates of one pair of tubes and the cathodes of the other pair of tubes, connections between the cathodes of said one pair of tubes and the plates of said other pair of tubes, a pulse generator individual to and connected with the grid of each tube for producing periodic firing pulses for activating its associated tube and causing it to conduct, pulse frequency control means coupled with said generators and phased with said alternating current for phasing said generators approximately 180° apart to fire successively one tube of each pair and then fire successively the other tube of each pair, means for biasing each tube and phase shift means responsive to a signal voltage for simultaneously advancing the phase of the firing pulses of one pair of tubes and retarding the phase of the other pair of tubes to produce a direct current of one polarity, and for simultaneously retarding the phase of the pulses of said one pair and advancing the phase of the pulses of the other pair to produce a direct current of another polarity.

5. In alternating current rectifying apparatus, having sequentially operated grid controlled rectifiers, firing means coupled to said rectifiers comprising a square wave generator operated in synchronism with said alternating current being rectified, and means for periodically blocking said square wave generator to produce periodic firing pulses of one polarity and intervening bias voltages of opposite polarity.

6. Alternating current rectifying apparatus comprising a plurality of sequentially operated grid-controlled rectifiers for rectifying each half cycle of an applied alternating voltage, pulse generating means individual to each rectifier and coupled thereto, each of said pulse generating means being adapted to fire its associated rectifier periodically at a frequency less than that of the applied alternating voltage, gate generating means coupled to said pulse generating means, said gate generating means controlling the frequency and sequence of the output pulses of said pulse generating means, and phase shifting means coupled to said pulse generating means, said phase shifting means being adapted to vary the phase of the output pulses of each of said pulse generating means relative to the phase of said applied alternating voltage.

7. In rectifying apparatus for producing a direct current from a source of alternating current, the combination comprising a plurality of sequentially operated grid-controlled rectifiers connected across said source of alternating current, a plurality of pulse generators, one pulse generator being coupled to each of said rectifiers, gate generating means coupled to said pulse generators, said gate generating means controlling the sequence of operation of said pulse generators and the frequency of their output pulses, and means coupled to said pulse generators for varying the phase of the output pulses of said pulse generators relative to the phase of said source of alternating current.

8. Apparatus for initiating sequential conduction of a plurality of grid-controlled rectifiers connected across a source of alternating voltage comprising pulse generating means individual to each rectifier and coupled to the grid thereof, said pulse generating means being adapted to fire its associated rectifier periodically at a frequency less than that of said applied alternating voltage, gate generating means coupled to said pulse generating means, said gate generating means controlling the sequence of operation of each of said pulse generating means and the frequency of their output pulses, and phase shifting means coupled to said pulse generating means and adapted to receive a control signal, said phase shifting means controlling the phase of the output pulses of each of said pulse generating means in accordance with said control signal.

9. A full-wave rectifying system comprising in combination, four grid-controlled rectifier tubes conducting current in sequence, a transformer having primary and secondary windings and being adapted for receiving an applied alternating voltage to be rectified, means coupling the anodes of a first pair of said rectifier tubes to one end terminal of said secondary winding, means coupling the anodes of the other pair of said rectifier tubes to the other end terminal of said secondary winding, means coupling the cathodes of said first pair of rectifier tubes to the cathodes of said second pair of rectifier tubes, pulse generator means coupled respectively to the control grids of said four rectifier tubes, gate generator means coupled to each of said pulse generator means and responsive to the applied alternating voltage for sequentially actuating said pulse generator means, and phase-shifting means coupled to each of said pulse generator means and responsive to the applied alternating voltage for controlling the phase of the pulses produced by said pulse generator means with respect to the applied alternating voltage, each of said rectifier tubes being actuated by its corresponding pulse generator means in sequence once every two cycles of the applied alternating voltage, said full-wave rectifying system producing a direct output voltage between said interconnected cathodes and a tap on said secondary winding.

10. Rectifying apparatus comprising in combination, four grid-controlled rectifier tubes conducting current in sequence, means coupling the anodes of a first pair of said rectifier tubes with the cathodes of the second pair of rectifier tubes, means coupling the cathodes of said first pair of rectifier tubes with the anodes of said second pair of rectifier tubes, pulse generator means coupled respectively to the control grids of said four rectifier tubes, gate generator means coupled to each of said pulse generator means and responsive to the applied alternating voltage for sequentially actuating said pulse generator means, phase-shifting means coupled to each of said pulse generator means and responsive to the applied alternating voltage for controlling the phase of the pulses produced by said pulse generator means with respect to the applied alternating voltage, each of said rectifier tubes being actuated by its corresponding pulse generator means in sequence once every two cycles of the applied alternating voltage, and load means adapted to be coupled in series with an applied alternating voltage, said series-connected load means and applied alternating voltage being coupled between the anodes of said first pair of rectifier tubes and the anodes of said second pair of rectifier tubes.

11. Apparatus for converting an alternating voltage into a direct voltage comprising in combination, four grid-controlled rectifier tubes, means coupling each of said grid-controlled rectifier tubes between a source of alternating voltage and a load, pulse generating means producing four independent pulse output signals having a recurrence frequency of one-half the frequency of the alternating current source, said four pulse output signals being displaced in phase with respect to each other, and means coupling said pulse generating means to the grids of said grid-controlled rectifiers, said pulse generating means causing said rectifier tubes to conduct in sequence with each rectifier tube conducting during particular half cycles of said alternating current different from the half cycles during which the other rectifier tubes conduct.

12. Apparatus for converting an alternating voltage into a direct voltage comprising in combination, at least four rectifier tubes each having a control electrode, means coupling each of said rectifier tubes between a source of alternating voltage and a load, pulse generating means producing independent pulse output signals for each of said rectifier tubes, said pulse output signals being displaced in phase relative to each other, and means coupling said pulse generating means to the control electrodes of said rectifier tubes, said pulse generating means causing said rectifier tubes to conduct in sequence with each rectifier tube conducting during particular half cycles of said alternating current different from the half cycles during which the other rectifier tubes conduct.

References Cited in the file of this patent

UNITED STATES PATENTS

| | | |
|---|---|---|
| 2,164,792 | Winograd | July 4, 1939 |
| 2,219,397 | Plebanski | Oct. 29, 1940 |
| 2,450,216 | Ainsworth | Sept. 28, 1948 |
| 2,621,318 | Few et al. | Dec. 9, 1952 |
| 2,748,317 | Van De Wiel | May 29, 1956 |